United States Patent [19]
Van Gemert et al.

[11] Patent Number: 5,753,146
[45] Date of Patent: May 19, 1998

[54] PHOTOCHROMIC NAPHTHOPYRAN COMPOSITIONS OF NEUTRAL COLOR

[75] Inventors: Barry Van Gemert, Murrysville; Delbert G. Kish, Irwin, both of Pa.

[73] Assignee: Transitions Optical, Inc., Pinellas Park, Fla.

[*] Notice: The term of this patent shall not extend beyond the expiration date of Pat. No. 5,645,767.

[21] Appl. No.: 626,220

[22] Filed: Mar. 29, 1996

[51] Int. Cl.$^6$ .................................................. G02B 5/23
[52] U.S. Cl. .................................................. 252/586
[58] Field of Search .................................. 252/586, 582

[56] References Cited

U.S. PATENT DOCUMENTS

| | | | |
|---|---|---|---|
| 4,286,957 | 9/1981 | Le Naour-Séné | 8/471 |
| 4,637,698 | 1/1987 | Kwak et al. | 351/163 |
| 4,818,096 | 4/1989 | Heller et al. | 351/163 |
| 4,826,977 | 5/1989 | Heller et al. | 544/70 |
| 4,851,471 | 7/1989 | Maltman et al. | 524/719 |
| 4,931,221 | 6/1990 | Heller | 252/586 |
| 4,968,454 | 11/1990 | Crano et al. | 252/586 |
| 4,980,089 | 12/1990 | Heller | 252/586 |
| 5,066,818 | 11/1991 | Gemert et al. | 549/389 |
| 5,200,116 | 4/1993 | Heller | 252/586 |
| 5,238,981 | 8/1993 | Knowles | 524/110 |
| 5,244,602 | 9/1993 | Van Gemert | 252/589 |
| 5,274,132 | 12/1993 | VanGemert | 549/389 |
| 5,384,077 | 1/1995 | Knowles | 252/586 |
| 5,391,327 | 2/1995 | Ligas et al. | 252/586 |
| 5,395,567 | 3/1995 | Van Gemert et al. | 252/586 |
| 5,405,958 | 4/1995 | VanGemert | 544/71 |
| 5,451,344 | 9/1995 | Knowles et al. | 252/586 |
| 5,458,814 | 10/1995 | Kumar et al. | 252/586 |
| 5,464,567 | 11/1995 | Knowles et al. | 252/586 |
| 5,466,398 | 11/1995 | Van Gemert et al. | 252/586 |
| 5,514,817 | 5/1996 | Knowles | 549/384 |

FOREIGN PATENT DOCUMENTS

| | | |
|---|---|---|
| 0681018A2 | 4/1995 | European Pat. Off. |
| 4325154 C1 | 9/1994 | Germany. |

OTHER PUBLICATIONS

"Reductive Degradation of Photochromic Spiro–Oxazines. Reaction of the Merocyanine Forms with Free Radicals", V. Malatesta et al, J. Org. Chem. 1995, 60, 5446–5448.

"Photochemical Ring–Opening Reactions of Substituted Chromenes and Isochromenes", A. Padwa et al, J. Org. Chem., 1975, vol. 40, pp. 1142–1149.

*Primary Examiner*—Philip Tucker
*Attorney, Agent, or Firm*—Frank P. Mallak; Irwin M. Stein

[57] ABSTRACT

Described are novel compositions of a carrier and at least two photochromic naphthopyran compounds, selected on the basis of specific criteria, that when exposed to solar ultraviolet radiation, exhibit neutral colors of gray or brown contained within the a* and b* ranges of +10 to −10 in the CIELAB color system. Also described are carriers, i.e., organic solvents and organic polymeric host materials, such as optically clear articles, e.g., ophthalmic lenses or other plastic transparencies that contain or that are coated with the naphthopyran compounds.

34 Claims, 3 Drawing Sheets

Figure 3

PHOTOCHROMIC NAPHTHOPYRAN COMPOSITIONS OF NEUTRAL COLOR

DESCRIPTION OF THE INVENTION

The present invention relates to compositions of certain photochromic naphthopyran compounds which when activated, i.e., exposed to solar ultraviolet radiation, exhibit the near neutral colors gray or brown. More particularly, this invention relates to photochromic compositions and articles containing such compositions that have at least two photochromic naphthopyran compounds selected on the basis of specific criteria, which when incorporated into an organic solvent or organic polymeric host and activated, exhibit a neutral color, as defined in the CIELAB color system.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes are oxazines, naphthopyrans and fulgides.

The use of combinations of organic photochromic compounds with absorptions in the visible spectrum has been disclosed in U.S. Pat. No. 4,968,454. In this patent, an oxazine with a visible absorption greater than 590 nanometers is mixed with a second oxazine having at least one activated absorption maximum in the visible range between 400 and 590 nanometers. German patent No. 43 25 154 C1 describes a polymerizable mixture containing a number of photochromic colorants, at least one of which is not a spirooxazine. U.S. Pat. No. 5,066,818 discloses a mixture of diaryl-3H-naphtho(2,1-b)pyrans with naphthoxazines or benzoxazines to obtain a near gray color. U.S. Pat. No. 4,818,096 discloses the combination of a yellow/orange coloring adamantane 2-spiropyran compound and a purple/blue coloring pyran containing at the 2-position a phenyl group substituted at the ortho or para positions with an amino substituent. U.S. Pat. No. 5,466,398 discloses the mixture of a 2-substituted-2H-naphtho[1,2-b]pyran with a variety of photochromic compounds both from the oxazine and pyran families to produce a gray or brown color. Although all of the aforedescribed disclosures can under ideal (primarily artificial) conditions produce a desirable gray or brown shade upon activation, it has now unexpectedly been found that under the wide variety of conditions a lens (or other article) might experience under solar exposure (natural conditions) such a desirable gray or brown coloration can be produced only by an admixture of certain naphthopyrans.

Combining photochromic compounds of different chemical families, e.g., a yellow/orange naphthopyran and a blue oxazine, that have different activation and bleaching rates results in the formation of different color shades during activation and fade. For example, if the naphthopyran has slower kinetics (activation and bleaching) than the oxazine, a combination of the two compounds will when activated initially color blue, proceed through a gray or brown shade, and then finally turn an orange-brown during the bleach or fade cycle. Such a mismatch in kinetics is commonly seen when attempting to pair photochromics from different families.

Combining photochromic compounds of different chemical families, e.g., naphthopyrans and oxazines, that have different absorption spectra in the UV also can result in different colors during different times of the day, at different latitudes, and during different seasons of the year. Unfiltered mid-day summer sun at low latitudes contains a much higher ratio of short wavelength ultraviolet (UV) (i.e., UVB) to long wavelength UV (i.e., UVA) than does sunlight at high latitudes or sunlight early or late in the day, or sunlight in the winter. The UVB/UVA ratio is highly dependent on all of the above-mentioned conditions and can vary dramatically. If the photochromic components of a lens absorb UV, i.e. activate, at different wavelengths, then the different photochromic components will perform differently depending on the UVB/UVA ratio. For example if the naphthopyran component of a lens has a λmax (UV) at 346 nm and the oxazine component has a λmax (UV) at 365 nm and the molar ratio of the components is balanced to give a gray activated color in unfiltered mid-day summer sun at low latitudes, then at high latitudes or sunlight early or late in the day (or in the winter sun), the lens will appear blue. Such a mismatch in UV absorption spectra is commonly seen when attempting to pair photochromics from different families. To achieve the most consistent performance under the greatest variety of solar conditions, it is most desirable that naphthopyrans used in combination absorb in the UV as close to the visible as possible where attenuation is minimal.

Combining photochromic compounds with different temperature dependencies also will result in different colors in the activated state depending on the temperature of the lens. Naphthopyrans have been shown to have superior temperature dependency (i.e., their darkening ability is less effected by heat) when compared to oxazines. An article, for example a lens, containing a naphthopyran and an oxazine at a molar ratio that provides a gray coloration in the activated state at room temperature, i.e., 72° F., will appear blue at low temperatures and brown at high temperatures. It has been found that a lens containing only a combination of certain naphthopyrans not only will remain a neutral gray (or brown) over a wide temperature range, but a highly desirable deeper degree of darkening will be achieved in warmer temperatures, which is when individuals spend the largest amount of time outdoors.

Combining photochromic compounds with different rates of fatigue into an article, for example a lens, will result also in a change in activated hue as the lens ages. If the non-blue component of a lens fatigues faster than the blue component, a lens that activates to a gray color when new would activate blue after an extended period of use. For this reason, photochromic compounds from families other than oxazines and pyrans, for example fulgides which have shown a rapid rate of fatigue, i.e., photodegradation, have been avoided. For the same reason, it is postulated that naphthopyrans containing a C—H containing group at the carbon α- to the oxygen of the pyran should be avoided for reasons of fatigue. See, for example, Padwa et al, J. Org. Chem., Vol. 40, No 8, 1975, page 1142. Naphthopyrans containing amino groups have also been avoided for reasons of fatigue—especially in imbibed articles where the photochromic component is exposed to oxidizing (atmospheric) conditions. Although oxazines and naphthopyrans (without the substitutions mentioned) have comparable low rates of fatigue, their differences in temperature dependency, kinetics and UV absorbancy make a mixture of oxazines and naphthopyrans less desirable.

Finally, it is most desirable that a photochromic composition be formulated for use in or applied to an article under the widest variety of conditions. Photochromic lenses may be prepared either by an imbibition process, as described in U.S. Pat. No. 4,286,957, or cast within the lens, as described in U.S. Pat. No. 4,851,471. It has been suggested that oxazine photochromic compounds can be used in a casting process by keeping the level of initiator low and by the judicious selection of the catalyst. It has recently been reported by Malatesta et al in J. Org. Chem., Vol. 60, No. 17, 1995, page 5446 that oxazine photochromic compounds are not totally inert to the mild catalysts commonly employed in the casting process, but rather react to form deeply colored adducts.

In accordance with the present invention, there are provided compositions comprising a carrier and at least two photochromic organic naphthopyrans that have been selected on the basis of their visible and ultraviolet light lambda max values, sensitivity, optical density and fade rate under solar simulated conditions. Such compositions, when activated under diverse solar conditions, have unexpectedly been found to demonstrate a near neutral color of gray or brown that is within the range of +10 to −10 for a* and b*, as defined in the CIELAB color system. In addition, compositions prepared by imbibition of the selected naphthopyrans into a polymeric host carrier demonstrate a temperature dependency value of less than 0.30.

DESCRIPTION OF THE DRAWINGS

For a better understanding of the present invention, reference may be made to the accompanying figures in which.

DETAILED DESCRIPTION OF THE INVENTION

In recent years, photochromic compositions, particularly photochromic plastic materials for optical applications, have been the subject of considerable attention. In particular, photochromic ophthalmic plastic lenses have been investigated because of the weight advantage they offer, vis-a-vis, glass lenses. Moreover, photochromic transparencies for vehicles, such as cars and airplanes, have been of interest because of the potential safety features that such transparencies offer.

The development of a near neutral coloring photochromic plastic material for optical applications that maintains a substantially neutral color during activation and fade within the temperature range of from 50° F. to 95° F. and under conditions of variable UV light which occurs depending on the time of the day, season and latitude, and over the lifetime of the material has been an unrealized goal. Typically, it has been reported that any blue-coloring organic photochromic compound can be combined with any orange-coloring organic photochromic compound to produce an activated neutral colored optical material, e.g., a lens. However, the formation of undesirable bluish or orange tints may occur in such a lens depending on the different properties of the individual photochromic compounds, i.e. activation and fade rates, fatigue rates, effects of temperature dependency and the wavelength of ultraviolet absorbance.

In accordance with the present invention, it has now been discovered that compositions comprising at least two photochromic organic naphthopyrans that meet specific selection criteria will exhibit the following properties when incorporated into a carrier for the naphthopyran compounds and exposed to solar ultraviolet radiation:

(a) an activated neutral color of gray or brown, which is defined herein as being within the range of +10 to −10 for a* and b* in the CIELAB color system; and (b) a difference of less than 6 units between the maximum and minimal a* values, and a difference of less than 14 units between the maximum and minimum b* values measured during activation and fade at 72° F. for a luminous transmittance of between 30 and 90%. Preferably, the composition exhibits a difference of less than 5 units between the maximum and minimum a* values and a difference of less than 13 units between the maximum and minimum b* values. More preferably, the difference between the maximum and minimum a* values is less than 4 units and the difference between the maximum and minimum b* values is less than 12 units. The preferred composition contains naphthopyrans as the principal photochromic materials, more preferably, as the only photochromic materials.

Other than in the operating examples, or where otherwise indicated, all numbers expressing wavelengths, quantities of ingredients or reaction conditions used herein are to be understood as modified in all instances by the term "about".

The carrier for the photochromic naphthopyran compounds may be an organic solvent or organic polymeric host material. When the photochromic composition comprising at least two photochromic naphthopyran compounds is imbibed into an organic polymeric host for the naphthopyran compounds and the imbibed polymeric host exposed to solar ultraviolet radiation, the composition also exhibits a temperature dependency of less than 0.30. Preferably, the temperature dependency is less than 0.28.

Temperature dependency, as defined herein, is the numerical product of dividing the difference between the optical density of a photochromic lens or test sample measured at 72° F. and 95° F. under solar simulated conditions by the numerical average of these 2 numbers. Temperature dependency relates the degree of coloration of an activated photochromic lens to the ambient temperature, e.g., a photochromic lens having a temperature dependency value of 0.38 becomes lighter as the temperature increases from 72° F. to 95° F. compared to a lens having a temperature dependency value of 0.27.

The photochromic naphthopyran compounds of the present invention are selected from the group consisting of 3[H]-naphtho[2,1-b]pyrans and 2[H]-naphtho[1,2-b]pyrans.

Such naphthopyrans may be represented by the following graphic formulae I and II, respectively:

The substituents represented by $(R)_m$, $(R')_m$, B and B' and additional modifications to graphic formulae I and II are described in the following patents and patent applications, the disclosures of which respecting those compound formulae are incorporated by reference herein: U.S. Pat. Nos. 4,818,096; 4,826,977; 4,931,221; 4,980,089; 5,066,818; 5,200,116; 5,238,981; 5,244,602; 5,274,132; 5,384,077; 5,395,567; 5,451,344; 5,458,814; 5,464,567; 5,466,398; and U.S. application Ser. No. 08/542,993, filed Oct. 13, 1995, now U.S. Pat. No. 5,645,767; application Ser. No. 08/542,999, filed Oct. 13, 1995, now U.S. Pat. No. 5,650,098; application Ser. No. 08/490,189, filed Jun. 14, 1995; application Ser. No. 08/490,188, filed Jun. 14, 1995, now U.S. Pat. No. 5,658,500; application Ser. No. 08/490,258, filed Jun. 14, 1995, now U.S. Pat. No. 5,658,501; application Ser. No. 08/490,190, filed Jun. 14, 1995, now U.S. Pat. No. 5,656,206; application Ser. No. 08/359,773, filed Dec. 20, 1994, now U.S. Pat. No. 5,552,090; application Ser. No. 08/345,095, filed Nov. 28, 1994, now U.S. Pat. No. 5,585,042; and application Ser. No. 08/286,039, filed Aug. 4, 1994, now U.S. Pat. No. 5,514,817.

More particularly, the compositions of photochromic organic naphthopyran compounds comprise:

(a) at least one photochromic organic naphthopyran compound having a visible lambda max of from 400 nanometers to 525 nanometers; and (b) at least one photochromic organic naphthopyran compound having a visible lambda max of from greater than 525 nanometers to 650 nanometers.

Photochromic naphthopyrans of the previously described group (a) include members selected from the group consisting of:

(1) 2,2-diphenyl-5-hydroxymethyl-6-methyl-9-methoxy-2H-naphtho[1,2-b]pyran;

(2) 2,2-diphenyl-5-hydroxymethyl-6-phenyl-2H-naphtho[1,2-b]pyran;

(3) 2,2-diphenyl-5-(2-ethoxy-2-oxo-ethoxycarbonyl)-8-methyl-2H-naphtho[1,2-b]pyran;

(4) 2,2-diphenyl-5-methoxycarbonyl-8-methyl-2H-naphtho[1,2-b]pyran;

(5) 3-(2-fluorophenyl)-3-(4-methoxyphenyl)-8-methoxy-9-methoxycarbonyl-3H-naphtho[2,1-b]pyran;

(6) 3,3-di-(4-methoxyphenyl)-6-morpholino-3H-naphtho[2,1-b]pyran;

(7) 3-(2-methyl-2,3-dihydrobenzofuran-5-yl)-3-(4-methoxyphenyl)-6-morpholino-3H-naphtho[2,1-b]pyran;

(8) 3,3-diphenyl-8-methoxy-3H-naphtho[2,1-b]pyran;

(9) 2,2-diphenyl-4-methoxycarbonyl-5-(2-methylproprionyloxy)-2H-naphtho[1,2-b]pyran; and (10) mixtures of said naphthopyrans.

The photochromic naphthopyrans of the previously described group (b) include members selected from the group consisting of:

(1) 3-(4-methoxyphenyl)-3-(3-methyl-4-methoxyphenyl)-13-hydroxy-indeno[2,1-f]naphtho[1,2-b]pyran;

(2) 3,3-di(4-methoxyphenyl)-13-hydroxy-13-methyl-indeno[2,1-f]naphtho[1,2-b]pyran;

(3) 3,3-di(4-methoxyphenyl)-6,11-dimethyl-13-(1-methylethyl)-13-hydroxy-indeno[2,1-f]naphtho[1,2-b]pyran;

(4) 3-(4-methoxyphenyl)-3-(3,4-dimethoxyphenyl)-6,11-dimethyl-13,13-dipropyl-indeno[2,1-f]naphtho[1,2-b]pyran; and (5) mixtures of said naphthopyrans.

More particularly, the photochromic naphthopyran compound of group (a) is selected from the group consisting of:

(1) 2,2-diphenyl-5-(2-ethoxy-2-oxo-ethoxycarbonyl)-8-methyl-2H-naphtho[1,2-b]pyran;

(2) 2,2-diphenyl-5-methoxycarbonyl-8-methyl-2H-naphtho[1,2-b]pyran; and (3) mixtures of said naphthopyrans.

More particularly, the photochromic naphthopyran compound of group (b) is 3,3-di(4-methoxyphenyl)-6,11-dimethyl-13-(1-methylethyl)-13-hydroxy-indeno[2,1-f]naphtho[1,2-b]pyran.

The naphthopyran compounds of groups (a) and (b) are selected based on certain selection criteria. The numerical values for the selection criteria are based on individual values when there is one compound selected from each of groups (a) and (b) or it is based on the average of the individual values when there is more than one compound selected from either of groups (a) or (b), i.e., the sum of the individual values divided by the number of individual values. More particularly, the difference between the visible lambda max value of the naphthopyrans of groups (a) and (b) is less than 150 nanometers but greater than 75 nanometers, and the difference between the UV lambda max value of the naphthopyrans of groups (a) and (b) is less than 50 nanometers and is within the range of 345–400 nanometers. Preferably, the difference between the visible lambda max value of the naphthopyrans of groups (a) and (b) is less than 130 nanometers but greater than 100 nanometers, and the difference between the UV lambda max value of the naphthopyrans of groups (a) and (b) is less than 30 nanometers and is within the range of 350–400 nanometers. More preferably, the difference between the visible lambda max value of the naphthopyrans of (a) and (b) is less than 120 nanometers but greater than 110 nanometers, and the difference between the UV lambda max value of the naphthopyrans of groups (a) and (b) is less than 20 nanometers and is within the range of 355–400 nanometers.

Additional selection criteria for the photochromic organic naphthopyran compounds are that the difference between the sensitivity values of the naphthopyrans of groups (a) and (b) is less than 0.25; the difference between the optical densities at saturation of the naphthopyrans of groups (a) and (b) is less than 0.2; and the difference between the fade rates (T1/2) of the naphthopyrans of groups (a) and (b) is less than 50 seconds. Preferably, the difference between the sensitivity values of the naphthopyrans of groups (a) and (b) is less than 0.20; the difference between the optical densities at saturation of the naphthopyrans of groups (a) and (b) is less than 0.1; and the difference between the fade rates (T1/2) of the naphthopyrans of groups (a) and (b) is less than 35 seconds. More preferably, the difference between the sensitivity values of the naphthopyrans of groups (a) and (b) is less than 0.15; the difference between the optical densities at saturation of the naphthopyrans of groups (a) and (b) is less than 0.05; and the difference between the fade rates (T1/2) of the naphthopyrans of groups (a) and (b) is less than 25 seconds.

Regarding the selection criteria for the naphthopyran compounds of the present invention, visible λmax is the wavelength in the visible spectrum at which the maximum absorption of the activated or colored form of the photochromic compound in the carrier occurs, UV λmax is the wavelength in the ultraviolet range closest to the visible spectrum at which the absorption of the activated form of the photochromic compound in the carrier occurs, sensitivity is the change in optical density of a photochromic compound in a carrier measured over the first five seconds of exposure to ultraviolet light and is expressed on a minute basis, optical density at saturation is the optical density of the photochromic compound in a carrier measured after 20 minutes of UV exposure, and fade (bleach) rate (T1/2) is the time interval in seconds for the absorbance of the activated photochromic in a carrier to reach one half the highest absorbance at room temperature after removal of the source of activating light.

The photochromic organic naphthopyrans described herein may be used in amounts (and in a ratio) such that an organic carrier to which the photochromic compounds or mixture of compounds is applied or in which they are incorporated exhibits a desired resultant color, e.g., a substantially neutral color when activated with unfiltered sunlight, i.e., as near a neutral color as possible given the colors of the activated photochromic compounds.

A neutral gray color exhibits a spectrum that has relatively equal absorption in the visible range between 400 and 700 nanometers. A neutral brown color exhibits a spectrum in which the absorption in the 400–550 nanometer range is moderately larger than in the 550–700 nanometer range. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., x=X/(X+Y+Z) and y=Y/(X+Y+Z). Color as described in the CIE system can be plotted on a chromaticity diagram, usually a plot of the chromaticity coordinates x and y. See pages 47–52 of *Principles of Color Technology*, by F. W. Billmeyer, Jr., and Max Saltzman, Second Edition, John Wiley and Sons, N.Y. (1981). As used herein, a near neutral color is one in which the chromaticity coordinate values of "x" and "y" for the color are within the following ranges for a $D_{65}$ illuminant and a 10 degree observer: x=0.274 to 0.355, y=0.300 to 0.365 following activation to 40 percent luminous transmission by exposure to solar radiation (Air Mass 1 or 2). Expressed in terms of CIELAB color space, a neutral color is one in which the chromaticity coordinate values of "a*" and "b*", under the same conditions as previously stated, range for a* from −10 to +10 and for b* from −10 to +10.

Previous definitions of near neutral color under similar conditions, e.g., U.S. Pat. No. 4,968,454, column 3, lines 24 to 30, have specified ranges for the chromaticity coordinates x (from 0.260 to 0.400) and y (from 0.280 to 0.400). These ranges correspond to a* and b* ranges in the CIELAB color system for a* from −43.6 to 54.0 and for b* from −22.5 to 33.1.

The amount of the photochromic naphthopyrans to be applied to or incorporated into a carrier is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic compounds. Typically, the more photochromic compound applied or incorporated, the greater is the color intensity up to a certain limit.

The relative amounts of the aforesaid photochromic compounds used will vary and depend in part upon the relative intensities of the color of the activated species of such compounds, and the ultimate color desired. Generally, the amount of total photochromic compound incorporated into or applied to a photochromic optical host material may range from about 0.05 to about 1.0, e.g., from 0.1 to about 0.45, milligrams per square centimeter of volume or surface to which the photochromic compounds is incorporated or applied.

The photochromic naphthopyrans of the present invention may be applied to or incorporated into the carrier by various methods described in the art. Such methods include dissolving or dispersing the photochromic compounds within the organic solvent or organic polymeric host material, e.g., casting it in place by adding the photochromic compounds to the monomeric host material prior to polymerization; imbibition of the photochromic compounds into the host material by immersion of the host material in a hot solution of the photochromic compounds or by thermal transfer; providing the photochromic compounds as a separate layer between adjacent layers of the host material, e.g., as a part of a polymeric film; and applying the photochromic compounds as part of a coating placed on the surface of the host material. The term "imbibition" or "imbibe" is intended to mean and include permeation of the photochromic compounds alone into the host material, solvent assisted transfer of the photochromic compounds into a porous polymer, vapor phase transfer, and other such transfer mechanisms.

Compatible (chemically and color-wise) tints, i.e., dyes, may be applied to the host material to achieve a more aesthetic result, for medical reasons, or for reasons of fashion. The particular dye selected will vary and depend on the aforesaid need and result to be achieved. In one embodiment, the dye may be selected to complement the color resulting from the activated photochromic compounds, e.g., to achieve a more neutral color or absorb a particular wavelength of incident light. In another embodiment, the dye may be selected to provide a desired hue to the host matrix when the photochromic compounds are in an unactivated state.

The carrier will usually be transparent, but may be translucent or even opaque. The carrier need only be pervious to that portion of the electromagnetic spectrum, which activates the photochromic substance, i.e., that wavelength of ultraviolet (UV) light that produces the open or colored form of the substance and that portion of the visible spectrum that includes the absorption maximum wavelength of the substance in its UV activated form, i.e., the open form. Preferably, the host color should not be such that it masks the color of the activated form of the photochromic compounds, i.e., so the change in color is readily apparent to the observer.

The carrier of the present invention may be an organic solvent or an organic polymeric host. The organic solvent may be selected from the group consisting of benzene, toluene, methyl ethyl ketone, acetone, ethanol, tetrahydrofurfuryl alcohol, N-methyl pyrrolidinone, 2-methoxyethyl ether, xylene, cyclohexane, 3-methyl cyclohexanone, ethyl acetate, tetrahydrofuran, methanol, methyl propinate, ethylene glycol and mixtures thereof. Preferably, the organic solvent is selected from the group consisting of acetone, ethanol, tetrahydrofurfuryl alcohol, 2-methoxyethyl ether, 3-methyl cyclohexanone, N-methyl pyrrolidinone and mixtures thereof.

Preferably, the organic polymeric host material is a solid transparent or optically clear material, e.g., materials suitable for optical applications, such as plano and ophthalmic lenses, windows, automotive transparencies, e.g., windshields, aircraft transparencies, plastic sheeting, polymeric films, etc.

Examples of polymeric organic host materials are polymers prepared from individual monomers or mixtures of monomers selected from the following groups:

(a) diacrylate or dimethacrylate compounds represented by graphic formula III:

III wherein $R_1$ and $R_2$ may be the same or different and are hydrogen or methyl, and A is $(CH_2)$ and n is an integer of from 1 to 20;

(b) diacrylate or dimethacrylate compounds represented by graphic formula IV:

IV wherein D is $CH_2CR_1R_2$ and p is an integer of from 1 to 50; and (c) an acrylate or a methacrylate compound having an epoxy group represented by graphic formula V:

V wherein $R_3$ is hydrogen or methyl.

In graphic formulae III, IV and V, like letters used with respect to the definitions of different substituents have the same meaning.

Examples of diacrylate or dimethacrylate compounds represented by graphic formulae III and IV include diethylene glycol dimethacrylate, triethylene glycol dimethacrylate, etc., butanediol dimethacrylate and poly(oxyalkylene dimethacrylates), e.g., polyethylene glycol (600) dimethacrylate. Examples of acrylate or methacrylate compounds represented by graphic formula V include glycidyl acrylate and glycidyl methacrylate.

Further examples of polymeric organic host materials which may be used with the photochromic compounds described herein include: polymers, i.e., homopolymers and copolymers, of the monomers and mixtures of monomers represented by graphic formulae III, IV and V, bis(allyl carbonate) monomers, diisopropenyl benzene monomers, ethoxylated bisphenol A dimethacrylate monomers, ethylene glycol bismethacrylate monomers, poly(ethylene glycol) bis methacrylate monomers, ethoxylated phenol bis methacrylate monomers, alkoxylated polyhydric alcohol polyacrylate monomers, such as ethoxylated trimethylol propane triacrylate monomers, urethane acrylate monomers, such as those described in U.S. Pat. No. 5,373,033, and vinylbenzene monomers, such as those described in U.S. Pat. No. 5,475,074 and styrene; polymers, i.e., homopolymers and copolymers, of polyfunctional, e.g., mono-, di- or multifunctional, acrylate and/or methacrylate monomers, poly($C_1$-$C_{12}$alkyl methacrylates), such as poly(methyl methacrylate), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, thermoplastic polycarbonates, polyesters, poly(ethylene terephthalate), polystyrene, poly(alpha methylstyrene), copoly(styrene-methyl methacrylate), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers, e.g., ethyl acrylate, butyl acrylate.

Transparent copolymers and blends of transparent polymers are also suitable as host materials. Preferably, the host material is an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80-90 percent diethylene glycol bis (allyl carbonate) and 10-20 percent vinyl acetate, particularly 80-85 percent of the bis(allyl carbonate) and 15-20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polymers of members of the group consisting of diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

More particularly, contemplated is use of the combination of photochromic naphthopyrans of the present invention with optical organic resin monomers used to produce optically clear polymerizates, i.e., materials suitable for optical applications, such as for example plano and ophthalmic lenses, windows, and automotive transparencies. Such optically clear polymerizates may have a refractive index that may range from about 1.48 to about 1.75, e.g., from about 1.495 to about 1.66. Specifically contemplated are optical resins sold by PPG Industries, Inc. under the designation CR-307 and CR-407.

The present invention is more particularly described in the following examples which are intended as illustrative only, since numerous modifications and variations therein will be apparent to those skilled in the art.

EXAMPLE 1

Compounds 1 and 2 are naphthopyrans which have a visible lambda max within the range of from 400 nanometers to 525 nanometers. Compound 1 is 2,2-diphenyl-5-(2-ethoxy-2-oxo-ethoxycarbonyl)-8-methyl-2H-naphtho[1,2-b]pyran; and Compound 2 is 2,2-diphenyl-5-methoxycarbonyl-8-methyl-2H-naphtho[1,2-b]pyran. The compounds may be prepared by the methods described in U.S. patent application Ser. No. 08/490,190 filed Jun. 14, 1995 and in U.S. Pat. No. 5,458,814, respectively.

Compound 3 is a naphthopyran having a visible lambda max within the range of from greater than 525 nanometers to 650 nanometers, and is 3,3-di(4-methoxyphenyl)-6,11-dimethyl-13-(1-methylethyl)-13-hydroxy-indeno[2,1-f]naphtho[1,2-b]pyran. Compound 3 may be prepared by the methods described in U.S. patent application Ser. No. 08/542,993 filed Oct. 13, 1995

COMPARATIVE EXAMPLE

Comparative (CE) Compounds 1, 2 and 3 are photochromic compounds of the oxazine family having a visible lambda max in the range of greater than 525 to 650 nanometers. Comparative Example Compounds 1 and 2 may be prepared by the methods described in U.S. Pat. No. 4,637,698, and Comparative Compound 3 may be prepared by the methods described in U.S. Pat. No. 5,405,958. The identity of the oxazine compounds is as follows:

CE Compound 1 is 1-propyl-3,3-dimethyl-5-methoxy-spiro[indoline-2,3'-[3H]pyrido[3,2-f][1,4]benzoxazine;

CE Compound 2 is 1-propyl-3,3,5,6(or 3,3,4,5)-tetramethyl-spiro[indoline-2,3'-[3H]pyrido[3,2-f][1,4]benzoxazine; and CE Compound 3 is 1,3,3,4,5 (or 1,3,3,5,6)-pentamethyl-9'-methoxycarbonyl-8'-acetoxy-spiro[indoline-2,3'-[3H]naphth[2,1-b][1,4]oxazine.

Comparative (CE) Compounds 4, 5, 6 and 7 are naphthopyrans having a visible lambda max in the range of from 400 to 525 nanometers. Comparative Compounds 4 and 5 may be prepared by the methods described in U.S. Pat. Nos. 5,066,818 and 5,238,981, respectively. Comparative Compounds 6 and 7 may be prepared by the methods described in U.S. Pat. No. 5,458,814. The identity of the naphthopyran compounds is as follows:

CE Compound 4 is 3-(4-methoxyphenyl)-3-(2,4-dimethoxyphenyl)-3H-naphtho[2,1-b]pyran;

CE Compound 5 is 8-methoxy-3-(2-fluorophenyl)-3-(4-methoxyphenyl)-3H-naphtho[2,1-b]pyran;

CE Compound 6 is 2,2-bis(4-methoxyphenyl)-5-methoxycarbonyl-6-methyl-9-methoxy-[2H]-naphtho[1,2-b]pyran; and CE Compound 7 is 2,2-diphenyl-5-methoxycarbonyl-6-(2-methylpropionyloxy)-[2H]-naphtho[1,2-b]pyran.

EXAMPLE 2

Part A

Testing was done with the photochromic compounds described in Example 1 in the following manner. A quantity of photochromic compound calculated to yield a $1.5 \times 10^{-3}$ molal solution was added to a flask containing 50 grams of a monomer blend of 4 parts ethoxylated bisphenol A dimethacrylate (BPA 2EO DMA), 1 part poly(ethylene glycol) 600 dimethacrylate, and 0.033 weight percent 2,2'-azobis(2-methyl propionitrile) (AIBN). The photochromic compound was dissolved into the monomer blend by stirring and gentle heating, if necessary. After a clear solution was obtained, it was poured into a flat sheet mold having the interior dimensions of 2.2 mm×6 inches (15.24 cm)×6 inches (15.24 cm). The mold was sealed and placed in a horizontal air flow, programmable oven programmed to increase the temperature from 40° C. to 95° C. over a 5 hour interval, hold the temperature at 95° C. for 3 hours and then lower it to 60° C. for at least 2 hours. After the mold was opened, the polymer sheet was cut using a diamond blade saw into 2 inch (5.1 centimeters) test squares.

Part B

The photochromic test squares prepared in Part A were tested for photochromic response on an optical bench. Prior to testing on the optical bench, the photochromic test squares were exposed to 365 nanometer ultraviolet light for about 15 minutes to activate the photochromic compounds and then placed in a 76° C. oven for about 15 minutes to bleach or inactivate the photochromic compounds. The test squares were then cooled to room temperature, exposed to fluorescent room lighting for at least 2 hours and then kept covered for at least 2 hours prior to testing on an optical bench maintained at 75° F. (23.9° C.). The bench was fitted with a 150 watt Xenon arc lamp, a remote controlled shutter, a copper sulfate bath acting as a heat sink for the arc lamp, a Schott WG-320 nm cut-off filter which removes short wavelength radiation; neutral density filter(s) and a sample holder in which the square to be tested was inserted. A collimated beam of light from a tungsten lamp was passed through the square at a small angle (approximately 30°) normal to the square. After passing through the square, the light from the tungsten lamp was directed to a detector through Spectral Energy Corp. GM-200 monochromator set at the previously determined visible lambda max of the photochromic compound being measured. The output signals from the detector were processed by a radiometer.

Change in optical density ($\Delta$OD) was determined by inserting a test square in the bleached state into the sample holder, adjusting the transmittance scale to 100%, opening the shutter from the Xenon lamp to provide ultraviolet radiation to change the test square from the bleached state to an activated (i.e., darkened) state, measuring the transmittance in the activated state, and calculating the change in optical density according to the formula: $\Delta OD = \log(100/\%Ta)$, where % Ta is the percent transmittance in the activated state and the logarithm is to the base 10.

The $\Delta$OD/Min, which represents the sensitivity of the photochromic compound's response to UV light, was measured over the first five (5) seconds of UV exposure, then expressed on a per minute basis. The saturation optical density ($\Delta$OD@Sat) was taken under identical conditions as the $\Delta$OD/Min, except UV exposure was continued for 20 minutes for the examples in Table 1. The lambda max (Vis) is the wavelength in the visible spectrum at which the maximum absorption of the activated (colored) form of the photochromic compound in a test square occurs. The lambda max (Vis) wavelengths reported in Table 1 were determined by testing the photochromic test squares polymerizates of Part A in a Varian Cary 3 UV-Visible spectrophotometer. The lambda($\lambda$) max (UV) is the wavelength in the ultraviolet range closest to the visible spectrum at which the absorption of the photochromic compound occurs. These absorptions were also determined with the same spectrophotometer and are reported in Table 1. The Bleach Rate (T 1/2) is the time interval in seconds for the absorbance of the activated form of the photochromic compound in the test squares to reach one half the highest absorbance at room temperature (75° F., 23.9° C.) after removal of the source of activating light. Results for the photochromic compounds tested are listed in Table 1.

Part C

Further testing was done with mixtures of the photochromic compounds described in Example 1 and the Comparative Example by incorporating them into test sample plano lenses by an imbibition procedure. The test sample lenses were prepared from optical resins sold by PPG Industries, Inc. under the designations CR-307 and CR-407, and measured 76 mm in diameter. Test Compositions 1, 2, 3, 4, 5 and 6 were prepared using the mixture of specified photochromic compounds (in a specified weight ratio) in the optical resins listed in Table 2. Each composition was dissolved to form a solution of approximately 10 weight percent in an imbibition formulation comprising resin, stabilizers and a mixture of n-methyl pyrrolidone, 2-methoxyethyl ether and tetrahydrofurfuryl alcohol. The solution was then spin coated onto the test samples and allowed to dry. Samples were then heated in a hot-air oven at 135°–155° C. for a period of time sufficient to thermally transfer the photochromic into the test lenses. After cooling, the resulting resin film was removed from the test samples by washing with water followed by acetone. The residence time in the oven for the test samples was adjusted to imbibe comparable amounts of the photochromic compounds.

Part D

The photochromic test lenses prepared in Part C were tested for photochromic response on an optical bench simulating solar conditions. The same procedure described in Part B for activating and inactivating the photochromic compounds prior to testing on an optical bench was followed. The optical bench was fitted with a 300 watt Xenon arc lamp, a remote controlled shutter, a Schott 3 mm KG-2 cut-off filter which removes short wavelength radiation, and neutral density filter(s).

The solar simulated conditions were established by first measuring outdoor responses of photochromic lenses worn by individuals while walking outside in large quadrants. Measurements and conditions were reported after each leg of the quadrant i.e., about 200 feet, and were averaged. The output of the optical bench was adjusted until this averaged response was obtained. Solar simulated conditions for the temperature dependency study, shown in FIG. 1, for 72° F. were 220 watts with 1.5 neutral density filter and KG-2 filter and for 95° F. were 235 watts with 1.6 neutral density culture and KG-2 filter. The activated percent luminous transmittance values of FIG. 1 were derived from the calculations determining the photopic optical density values and previously collected transmittance values for an unactivated test square.

Figure 2:
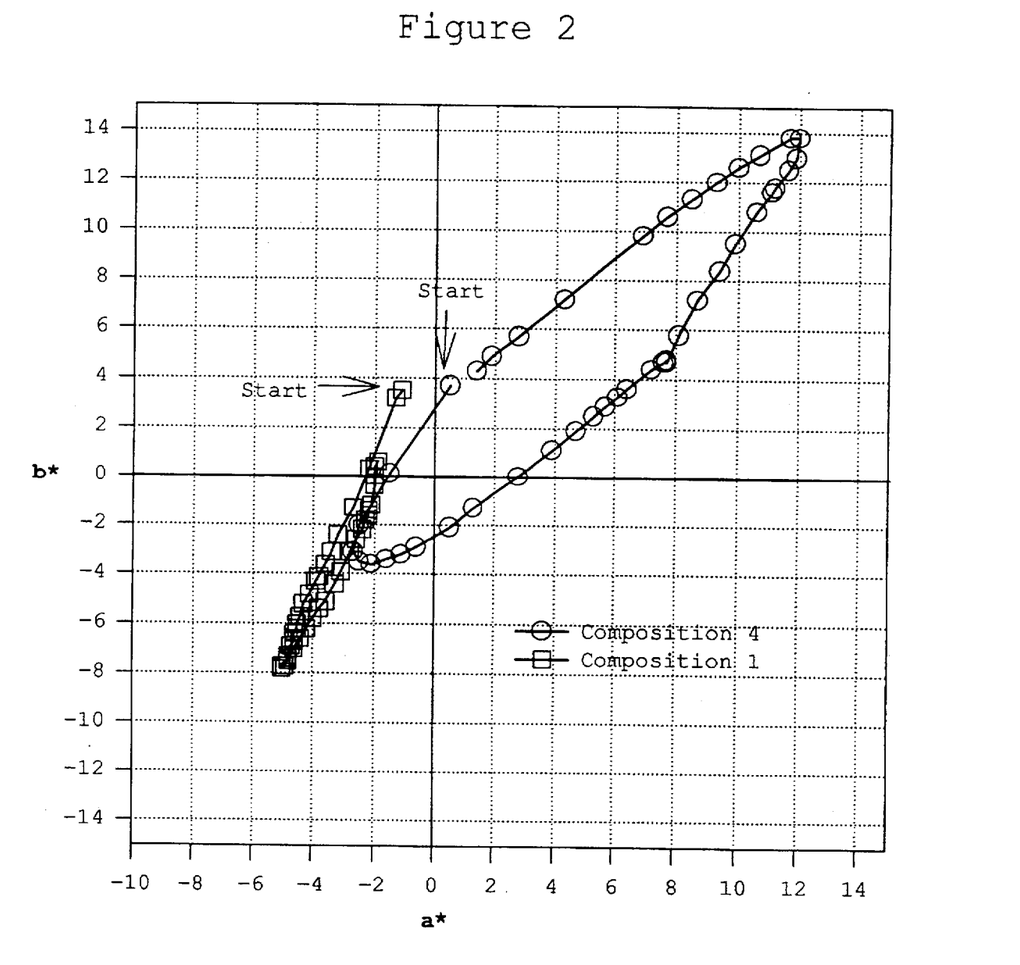
FIG. 2 is a color consistency chart of the CIELAB color coordinates b* vs a* for Composition 1 and Composition 4.
Figure 3:
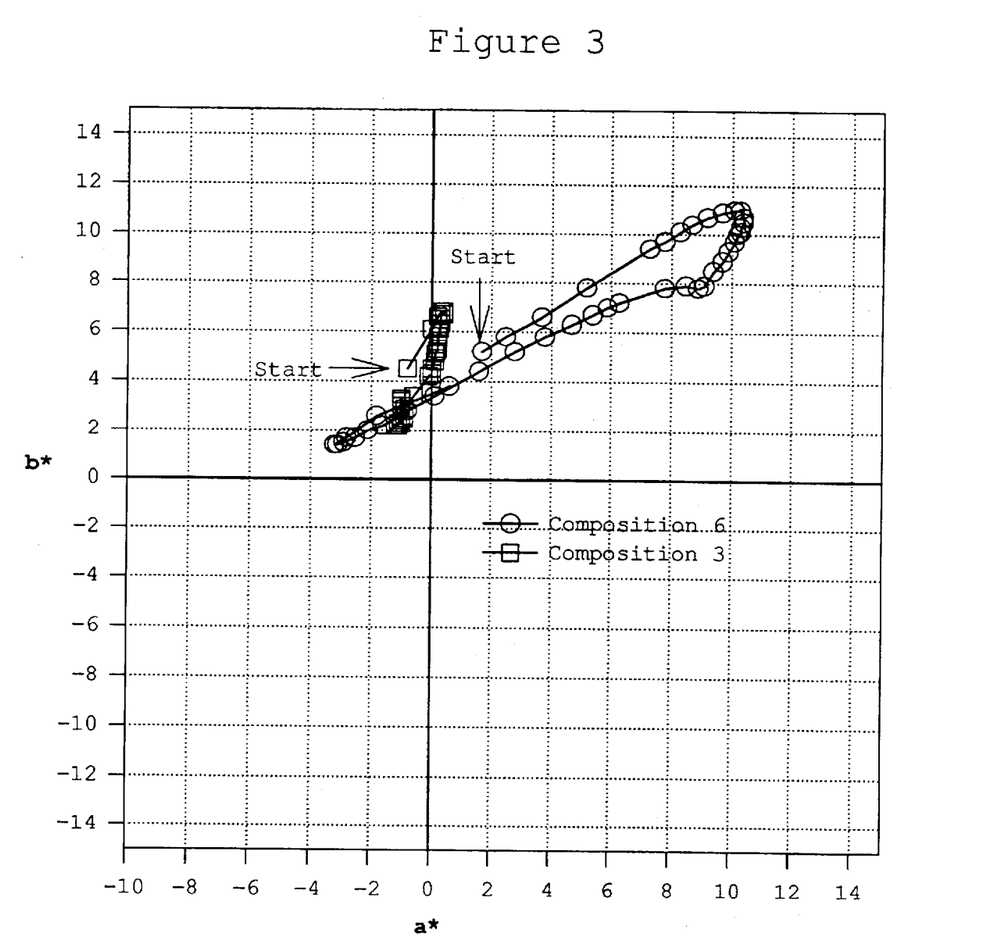
FIG. 3 is a color consistency chart of the CIELAB color coordinates b* vs a* for Composition 3 and Composition 6.

The activation cycle shown in the color consistency studies of FIGS. 2 and 3 was obtained by the combination of controlling the output of the xenon arc lamp directed 15° normal to the sample and subsequent filtering of the light to produce solar simulated conditions. The fade cycle was obtained by closing the remote shutter. During both cycles, the test samples were held at 72° F. for 30 minutes in a temperature controlled quartz cell. Also during the activation and fade cycles, a collimated monitoring beam of light from a tungsten lamp was passed through the test sample at −15° normal to the surface of the sample. After passing through the sample, the light from the tungsten lamp was directed through a photopic filter attached to a detector. The output signals from the detector were processed by a radiometer. Another low intensity monitoring beam of light was directed perpendicular to the test sample via a fiber optic cable from a SC Technologies-Model CSE-10 spectrophotometer. The fiber optic cable was aimed at a target fiber optic cable returning to the spectrophotometer for measurement of the color values in the color consistency studies shown in FIGS. 2 and 3. The color values, i.e., a* and b*, of the CIELAB color space were collected under the conditions of a $D_{65}$ illuminant and a 10 degree observer. The control of the test conditions and acquisition of data was handled by the Labtech Notebook Pro software and the recommended I/O board.

TABLE 1

| EXAMPLE COMPOUNDS | ($\lambda$) max (VIS) | ($\lambda$) max (UV) | $\Delta$OD/MIN SENSITIVITY | $\Delta$OD @ SATURATION | Bleach (T½) |
|---|---|---|---|---|---|
| 1 | 464 | 372 | 0.39 | 0.37 | 60 |
| 2 | 467 | 368 | 0.27 | 0.37 | 71 |
| 3 | 582 | 359 | 0.26 | 0.36 | 81 |
| CE 1 | 622 | 348 | 0.26 | 0.35 | 61 |
| CE 2 | 616 | 348 | 0.32 | 0.42 | 57 |
| CE 3 | 628 | 368 | 0.32 | 0.5 | 72 |
| CE 4 | 486 | 348 | 0.22 | 0.63 | 271 |
| CE 5 | 491 | 359 | 0.24 | 0.7 | 198 |
| CE 6 | 524 | 357 | 0.16 | 0.35 | 135 |
| CE 7 | 475 | 350 | 0.3 | 0.77 | 186 |

The results of Table 1 show that Compounds 1 and 1 or 2 would be suitable to combine with Compound 3 to yield a composition of the present invention. The use of a combination of compounds CE 1, 2 and 3 with CE compounds 4, 5, 6 and 7 or with Compounds 1 and 2 would not meet at least one of the criteria of the present invention, e.g., the difference being greater than 140 nm but less than 75 nm for $\lambda$ max visible; a difference of less than 50 nm for $\lambda$ max UV; 0.25 units for sensitivity; 0.2 units for optical density at saturation; and 50 seconds for fade rate.

TABLE 2

| COMPOSITION (COLOR) | COMPOUNDS | WEIGHT RATIO | OPTICAL RESINS |
|---|---|---|---|
| 1 (GRAY) | 3,1 | 60/40 | CR-407 |
| 2 (GRAY) | 2,1 | 60/40 | CR-407 |
| 3 (BROWN) | 3,1 | 35/65 | CR-407 |
| 4 (GRAY) | CE1, CE2, CE4, CE5 | 29/25/30/16 | CR-307 |
| 5 (GRAY) | CE3, CE6, CE7 | 42.5/30/27.5 | CR-407 |
| 6 (BROWN) | CE3, CE6, CE7 | 34/34/32 | CR-307 |

Figure 1:
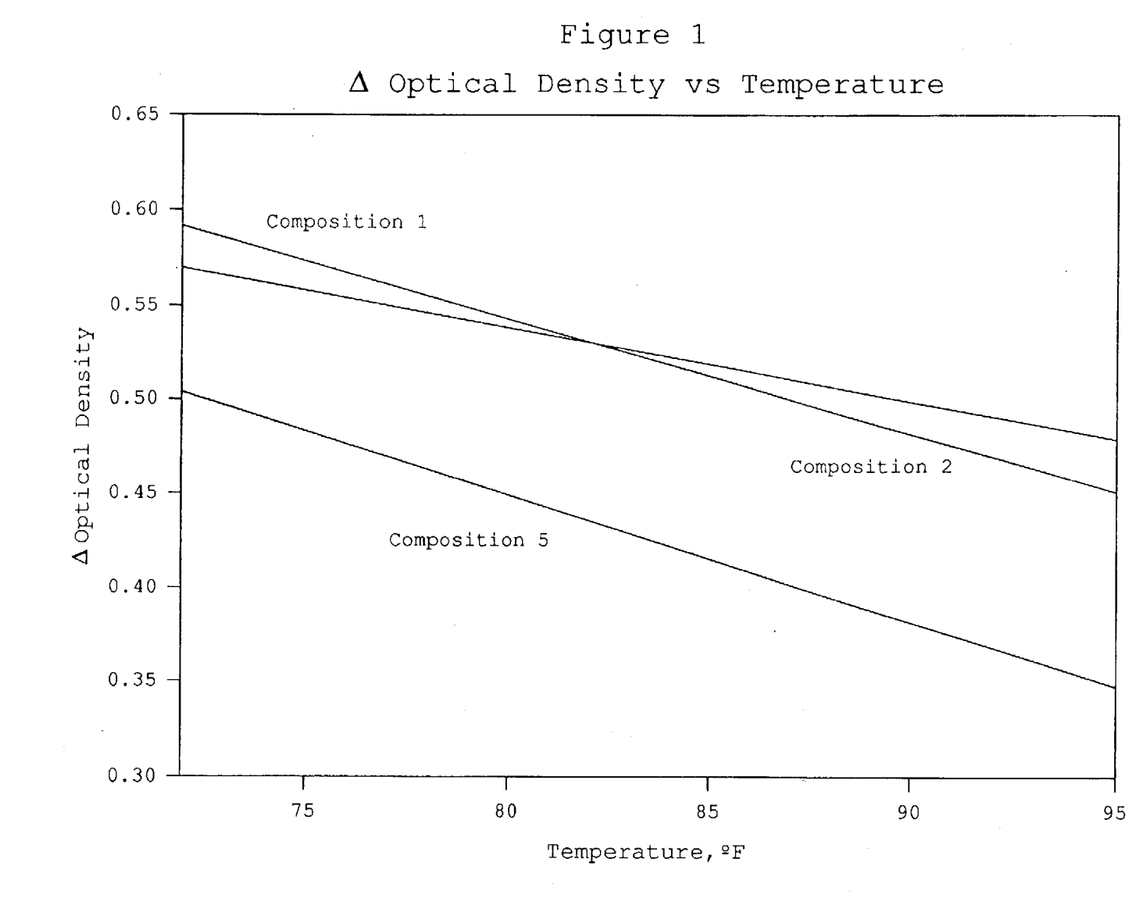
FIG. 1 is a graph of Δ Optical Density vs. Temperature for Composition 1, Composition 2 and Composition 5 of the Examples.

The comparison of Compositions 1 and 2 with Composition 5 in FIG. 1 under solar simulated conditions shows less of a decrease in the $\Delta$ Optical Density for Compositions 1 and 2 at temperatures above 72° F. This result is related to the temperature dependence of the photochromic composition. The temperature dependence is calculated by using the following formula:

$$\frac{\Delta OD\ 72°\ F. - \Delta OD\ 95°\ F.}{\text{Average }(\Delta OD\ 72°\ F. + \Delta OD\ 95°\ F.)}$$

Based on the data presented in FIG. 1, the temperature dependence of Composition 1 is 0.27, that of Composition 2 is 0.17, and that of Composition 4 is 0.38. FIGS. 2 and 3 show a comparison of the color consistency of Composition 1 with Composition 4 and of Composition 3 with Composition 5, respectively.

In FIG. 2, the activation/fade cycle plot of the color consistency of Composition 1 falls within the (b*,a*) coordinates of (3.5,−1.1) and (−7.8,−5). This corresponds to a difference in b* values of 11.3 and a difference in a* values of 3.9. The plot of the color consistency of Composition 4 falls within the (b*,a*) coordinates of (13.8, 12) and (−3.6, −2.7) which corresponds to a difference in b* and a* values of 17.4 and 14.7, respectively.

The activation/fade cycle plot of the color consistency in FIG. 3 for Composition 3 falls within the (b*,a*) coordinates of (6.8, 0.4) and (2.2, −1.2), corresponding to a difference in b* and a* values of 4.6 and 1.6, respectively. The plot of Composition 6 falls within the (b*,a*) values of (11, 10.4)

and (1.4, −3.2) which corresponds to a difference in b* and a* values of 9.6 and 13.6, respectively.

The present invention has been described with reference to specific details of particular embodiments thereof. It is not intended that such details be regarded as limitations upon the scope of the invention except insofar as to the extent that they are included in the accompanying claims.

We claim:

1. A composition comprising at least two photochromic naphthopyran compounds, said naphthopyran compounds being free of amino substituted aryl groups on the carbon atom adjacent to the oxygen atom of the pyran ring, said composition exhibiting the following properties when incorporated into a carrier for the naphthopyran compounds and exposed to solar ultraviolet radiation:

(a) an activated neutral color of gray or brown; and
   (b) a difference of less than 6 units between the maximum and minimum a* values and a difference of less than 14 units between the maximum and minimum b* values measured during activation and fade at 72° F. for a luminous transmittance of between 30 and 90%.

2. The composition of claim 1 wherein said carrier for the photochromic naphthopyran compounds is an organic solvent or organic polymeric host, and wherein said composition exhibits a difference of less than 5 units between the maximum and minimum a* values and a difference of less than 13 units between the maximum and minimum b* values.

3. The composition of claim 2 wherein the difference between the maximum and minimum a* values is less than 4 units and the difference between the maximum and minimum b* values is less than 12 units.

4. The composition of claim 1 wherein said photochromic naphthopyran compounds are selected from the group consisting of 3[H]-naphtho[2,1-b]pyrans and 2[H]-naphtho[1,2-b]pyrans.

5. The composition of claim 4 wherein said photochromic naphthopyran compounds comprise:

(a) at least one photochromic naphthopyran having a visible lambda max of from 400 nanometers to 525 nanometers; and
   (b) at least one photochromic naphthopyran having a visible lambda max of from greater than 525 nanometers to 650 nanometers.

6. The composition of claim 5 wherein the difference between the average visible lambda max value of the naphthopyrans of (a) and (b) is less than 150 nanometers but greater than 75 nanometers and the difference between the average UV lambda max value of the naphthopyrans of (a) and (b) is less than 50 nanometers and is within the range of 345–400 nanometers.

7. The composition of claim 6 wherein the difference between the average visible lambda max value of the naphthopyrans of (a) and (b) is less than 130 nanometers but greater than 100 nanometers and the difference between the average UV lambda max value of the naphthopyrans of (a) and (b) is less than 30 nanometers and is within the range of 350–400 nanometers.

8. The composition of claim 7 wherein the difference between the visible lambda max value of the naphthopyrans of (a) and (b) is less than 120 nanometers but greater than 110 nanometers and the difference between the UV lambda max value of the naphthopyrans of (a) and (b) is less than 20 nanometers and is within the range of 355–400 nanometers.

9. The composition of claim 2 wherein said organic solvent is selected from the group consisting of benzene, toluene, methyl ethyl ketone, acetone, ethanol, tetrahydrofurfuryl alcohol, N-methyl pyrrolidinone, 2-methoxyethyl ether, xylene, cyclohexane, 3-methyl cyclohexanone, ethyl acetate, tetrahydrofuran, methanol, methyl propinate, ethylene glycol and mixtures thereof.

10. The composition of claim 9 wherein said organic solvent is selected from the group consisting of acetone, ethanol, tetrahydrofurfuryl alcohol, 2-methoxyethyl ether, 3-methyl cyclohexanone, N-methyl pyrrolidinone and mixtures thereof.

11. The composition of claim 2 wherein said organic polymeric host material is selected from the group consisting of poly($C_1$–$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, and diallylidene pentaerythritol monomers.

12. The composition of claim 11 wherein the polymeric organic host material is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane and polymers of members of the group consisting of diethylene glycol bis(allyl carbonate) monomers, diethylene glycol dimethacrylate monomers, ethoxylated phenol bis methacrylate monomers, diisopropenyl benzene monomers and ethoxylated trimethylol propane triacrylate monomers.

13. The composition of claim 12 wherein said solid transparent polymer is an optical element.

14. The composition of claim 13 wherein said optical element is a lens.

15. The composition of claim 2 wherein said organic polymeric host is a polymerizate of an optical organic resin monomer.

16. The composition of claim 15 wherein the refractive index of the polymerizate is from 1.48 to 1.75.

17. The composition of claim 16 wherein the refractive index of the polymerizate is from 1.495 to 1.66.

18. The composition of claim 5 wherein:

(i) said photochromic naphthopyran compound (a) is selected from the group consisting of:
   (1) 2,2-diphenyl-5-hydroxymethyl-6-methyl-9-methoxy-2H-naphtho[1,2-b]pyran;
   (2) 2,2-diphenyl-5-hydroxymethyl-6-phenyl-2H-naphtho[1,2-b]pyran;
   (3) 2,2-diphenyl-5-(2-ethoxy-2-oxo-ethoxycarbonyl)-8-methyl-2H-naphtho[1,2-b]pyran;
   (4) 2,2-diphenyl-5-methoxycarbonyl-8-methyl-2H-naphtho[1,2-b]pyran;
   (5) 3-(2-fluorophenyl)-3-(4-methoxyphenyl)-8-methoxy-9-methoxycarbonyl-3H-naphtho[2,1-b]pyran;

(6) 2,2-diphenyl-4-methoxycarbonyl-5-(2-methylpropionyloxy)-2H-naphtho[1,2-b]pyran; and
(7) mixtures of said naphthopyrans;
(ii) said photochromic naphthopyran compound (b) is selected from the group consisting of:
(1) 3-(4-methoxyphenyl)-3-(3-methyl-4-methoxyphenyl)-13-hydroxy-indeno[2,1-f]naphtho[1,2-b]pyran;
(2) 3,3-di(4-methoxyphenyl)-13-hydroxy-13-methyl-indeno[2,1-f]naphtho[1,2-b]pyran;
(3) 3,3-di(4-methoxyphenyl)-6,11-dimethyl-13-(1-methylethyl)-13-hydroxy-indeno[2,1-f]naphtho[1,2-b]pyran;
(4) 3-(4-methoxyphenyl)-3-(3,4-dimethoxyphenyl)-6,11-dimethyl-13,13-dipropyl-indeno[2,1-f]naphtho[1,2-b]pyran; and
(5) mixtures of said naphthopyrans.

19. The composition of claim 18 wherein:
(i) said photochromic naphthopyran compound (a) is selected from the group consisting of:
(1) 2,2-diphenyl-5-(2-ethoxy-2-oxo-ethoxycarbonyl)-8-methyl-2H-naphtho[1,2-b]pyran;
(2) 2,2-diphenyl-5-methoxycarbonyl-8-methyl-2H-naphtho[1,2-b]pyran; and
(3) mixtures of said naphthopyrans;
(ii) said photochromic naphthopyran compound (b) is 3,3-di(4-methoxyphenyl)-6,11-dimethyl-13-(1-methylethyl)-13-hydroxy-indeno[2,1-f]naphtho[1,2-b]pyran.

20. The composition of claim 19 wherein:
(i) said photochromic naphthopyran compound (a) is 2,2-diphenyl-5-(2-ethoxy-2-oxo-ethoxycarbonyl)-8-methyl-2H-naphtho[1,2-b]pyran or 2,2-diphenyl-5-methoxycarbonyl-8-methyl-2H-naphtho[1,2-b]pyran; and
(ii) said photochromic naphthopyran compound (b) is 3,3-di(4-methoxyphenyl)-6,11-dimethyl-13-(1-methylethyl)-13-hydroxy-indeno[2,1-f]naphtho[1,2-b]pyran.

21. The composition of claim 6 wherein the difference between the average sensitivity value of the naphthopyrans of (a) and (b) is less than 0.25; the difference between the average optical density at saturation value of the naphthopyrans of (a) and (b) is less than 0.2; and the difference between the average fade rate (T1/2) of the naphthopyrans of (a) and (b) is less than 50 seconds.

22. The composition of claim 21 wherein the difference between the average sensitivity value of the naphthopyrans of (a) and (b) is less than 0.20; the difference between the average optical density at saturation of the naphthopyrans of (a) and (b) is less than 0.1; and the difference between the average fade rate (T1/2) of the naphthopyrans of (a) and (b) is less than 35 seconds.

23. The composition of claim 22 wherein the difference between the average sensitivity value of the naphthopyrans of (a) and (b) is less than 0.15; the difference between the average optical density at saturation of the naphthopyrans of (a) and (b) is less than 0.05; and the difference between the average fade rate (T1/2) of the naphthopyrans of (a) and (b) is less than 25 seconds.

24. The composition of claim 12 wherein:
(i) said photochromic naphthopyran compound (a) is selected from the group consisting of:
(1) 2,2-diphenyl-5-(2-ethoxy-2-oxo-ethoxycarbonyl)-8-methyl-2H-naphtho[1,2-b]pyran;
(2) 2,2-diphenyl-5-methoxycarbonyl-8-methyl-2H-naphtho[1,2-b]pyran; and
(3) mixtures of said naphthopyrans;
(ii) said photochromic naphthopyran compound (b) is 3,3-di(4-methoxyphenyl)-6,11-dimethyl-13-(1-methylethyl)-13-hydroxy-indeno[2,1-f]naphtho[1,2-b]pyran.

25. The composition of claim 24 wherein:
(i) said photochromic naphthopyran compound (a) is 2,2-diphenyl-5-(2-ethoxy-2-oxo-ethoxycarbonyl)-8-methyl-2H-naphtho[1,2-b]pyran or 2,2-diphenyl-5-methoxycarbonyl-8-methyl-2H-naphtho[1,2-b]pyran; and
(ii) said photochromic naphthopyran compound (b) is 3,3-di(4-methoxyphenyl)-6,11-dimethyl-13-(1-methylethyl)-13-hydroxy-indeno[2,1-f]naphtho[1,2-b]pyran.

26. A photochromic article comprising an organic polymeric host and at least two photochromic naphthopyran compounds, said naphthopyran compounds being free of amino substituted aryl groups on the carbon atom adjacent to the oxygen atom of the pyran ring, said article exhibiting the following properties when exposed to solar ultraviolet radiation:
(a) an activated neutral color of gray or brown;
(b) a difference of less than 6 units between the maximum and minimum a* values and a difference of less than 14 units between the maximum and minimum b* values measured during activation and fade at 72° F. for a luminous transmittance of between 30 and 90%; and
(c) a temperature dependency of less than 0.30.

27. The photochromic article of claim 26 wherein the difference between the maximum and minimum a* values is less than 4 units; the difference between the maximum and minimum b* values is less than 12 units; and the temperature dependency is less than 0.28.

28. The photochromic article of claim 26 wherein said photochromic naphthopyran compounds comprise:
(a) at least one photochromic naphthopyran having a visible lambda max of from 400 nanometers to 525 nanometers; and
(b) at least one photochromic naphthopyran having a visible lambda max of from greater than 525 nanometers to 650 nanometers.

29. The photochromic article of claim 28 wherein the difference between the visible lambda max value of the naphthopyrans of (a) and (b) is less than 120 nanometers but greater than 110 nanometers and the difference between the UV lambda max value of the naphthopyrans of (a) and (b) is less than 20 nanometers and is within the range of 355–400 nanometers.

30. The photochromic article of claim 29 wherein:
(i) said photochromic naphthopyran compound (a) is selected from the group consisting of:
(1) 2,2-diphenyl-5-(2-ethoxy-2-oxo-ethoxycarbonyl)-8-methyl-2H-naphtho[1,2-b]pyran;
(2) 2,2-diphenyl-5-methoxycarbonyl-8-methyl-2H-naphtho[1,2-b]pyran; and
(3) mixtures of said naphthopyrans;
(ii) said photochromic naphthopyran compound (b) is 3,3-di(4-methoxyphenyl)-6,11-dimethyl-13-(1-methylethyl)-13-hydroxy-indeno[2,1-f]naphtho[1,2-b]pyran.

31. The composition of claim 30 wherein:
(i) said photochromic naphthopyran compound (a) is 2,2-diphenyl-5-(2-ethoxy-2-oxo-ethoxycarbonyl)-8-methyl-2H-naphtho[1,2-b]pyran or 2,2-diphenyl-5-methoxycarbonyl-8-methyl-2H-naphtho[1,2-b]pyran; and (ii) said photochromic naphthopyran compound (b) is 3,3-di(4-methoxyphenyl)-6,11-dimethyl-13-(1-methylethyl)-13-hydroxy-indeno[2,1-f]naphtho[1,2-b]pyran.

32. The photochromic article of claim 26 wherein the polymeric organic host material is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane and polymers of members of the group consisting of diethylene glycol bis(allyl carbonate) monomers, diethylene glycol dimethacrylate monomers, ethoxylated phenol bis methacrylate monomers, diisopropenyl benzene monomers and ethoxylated trimethylol propane triacrylate monomers.

33. The photochromic article of claim 32 wherein said solid transparent polymer is an optical element.

34. The composition of claim 33 wherein said optical element is a lens.

* * * * *